United States Patent
Kaelin et al.

(10) Patent No.: US 7,052,798 B2
(45) Date of Patent: May 30, 2006

(54) ENERGY SOURCE MOUNTING DEVICE FOR A PORTABLE ELECTRONIC APPARATUS

(75) Inventors: Laurent Kaelin, Sonvilier (CH); Fabien Henriet, Courtételle (CH); Jean-Philippe Rebeaud, Cressier (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 192 days.

(21) Appl. No.: 10/732,477

(22) Filed: Dec. 11, 2003

(65) Prior Publication Data
US 2004/0121226 A1 Jun. 24, 2004

(30) Foreign Application Priority Data
Dec. 19, 2002 (CH) ..................................... 2166/02

(51) Int. Cl.
*H01M 2/10* (2006.01)
(52) U.S. Cl. .................... 429/96; 361/679; 423/123; 338/81 R
(58) Field of Classification Search ........ 361/679–687, 361/724–727; 429/96–98; 423/123; 368/88; 338/81 R
See application file for complete search history.

(56) References Cited

U.S. PATENT DOCUMENTS 3,945,193 A * 3/1976 Yasuda et al. ................. 368/88
4,223,076 A * 9/1980 Terada .......................... 429/96
5,436,088 A * 7/1995 Castaneda et al. ............ 429/96

OTHER PUBLICATIONS

Database WPI, Section EI, Week 200176, Derwent Publications Ltd., London, GB,AN 2001-663073 XP002242262 & WO 01 77760 (Seiko Instr. Inc.), Oct. 18, 2001.

* cited by examiner

*Primary Examiner*—Hung Van Duong
(74) *Attorney, Agent, or Firm*—Sughrue Mion, PLLC

(57) ABSTRACT

The present invention concerns a device for mounting a source of electric energy (100), preferably a button-type battery, for a portable electronic apparatus including a housing (3, 44), closed by a cover (14, 49), for said energy source. The housing includes, in proximity to its periphery, tongues (5, 32) that can be deformed for holding the energy source axially in the housing. Further, the cover includes a wall (15, 50) projecting into the housing and arranged between the periphery of the housing and the tongues retaining the energy source. The wall of the cover thus ensures that the tongues are held properly against the energy source when the latter is arranged in the housing, in particular in the event of a violent shock.

20 Claims, 5 Drawing Sheets

ENERGY SOURCE MOUNTING DEVICE FOR A PORTABLE ELECTRONIC APPARATUS

FIELD OF THE INVENTION

The present invention concerns a device for mounting a source of electrical energy, in particular a button-type battery, in a portable electronic device.

The invention concerns, more precisely, a device for mounting a source of electrical energy in a portable electronic apparatus including a housing capable of receiving the energy source through an aperture and a cover for closing the aperture of the housing, the latter having in its peripheral region, means for retaining the energy source having at least a first position in which said energy source is held in the housing.

The invention also concerns an electronic apparatus including electronic circuits powered by an electrical energy source, preferably a button-type battery, and including a device for mounting said electrical energy source as described above.

Moreover, the invention concerns a method for mounting an electrical energy source in a mounting device of the same type.

BACKGROUND OF THE INVENTION

The state of the art includes numerous documents relating to battery mounting devices.

International Patent Application No. WO 01/77760 A1, published on 18, Oct. 2001 discloses a device for mounting a button type battery in an electronic watchcase. This device includes, in particular, a substantially cylindrical housing, moulded from plastic material and opening onto the back face of the watch. The housing includes, on its periphery, tongues extending from the bottom towards the opening and preferably moulded in one piece with the housing. Each tongue has a bent portion, in its end region, provided to form a support zone on the face of the battery oriented to the side of the opening, when the battery is mounted in the housing. Mounting is achieved by elastically deforming the tongues.

It should be noted that this solution provides that the bent portion of one tongue widens from one edge of the tongue towards the other so as to have a support zone with a sufficiently large surface area to guarantee that the battery is efficiently held axially in the housing.

However, this particular structure has one drawback in that in order to introduce a battery into the housing, the latter has to be inserted slantwise through the aperture of the housing. Thus, this insertion is difficult to implement in an automated assembly line.

Further, the structure described in the aforecited International Patent Application has another drawback linked to a risk of the battery being held defectively in the event of a shock. If the shock is sufficiently violent, the battery, which has a relatively large mass compared to the constituent elements of the watch, can be projected in a direction such that it can deform the elastic tongues and be removed from the housing. In such case, the first consequence of the inadvertent movement of the battery is a risk of interrupting the supply of electric power to the watch.

One solution to this problem is provided, in the International Application, to improve the hold of the battery in its housing. For this purpose, one particular embodiment provides snugs placed on the top of the bent portion of the tongues, these snugs cooperating with the cover or bottom to deform the tongues substantially in the direction of the battery. Thus, the latter is better held in its housing in the event of a shock.

However, a brutal movement of the battery can cause additional problems, in particular when the cover closing the housing or, in the case of the aforecited document, the back cover of the watch, is not securely fixed to the case, for example screwed on or held by screws. By releasing itself from the tongues, the battery can be projected against the cover of the housing and damage the fixing of the latter to the watchcase. In the case of a water-resistant watch, this can lead to a defect in the water resistance of the watch. Moreover, depending on the force of the shock, the cover can be completely released from its housing and get lost. The embodiment providing snugs to prevent deformation of the tongues does not properly overcome this problem since a significant force exerted on the tongues by the battery is directly transmitted to the cover towards the outside of the watchcase. The cover can thus also be released from the housing in this case.

SUMMARY OF THE INVENTION

It is an object of the present invention to overcome the aforementioned drawbacks of the prior art by improving the hold of the battery in its housing and preventing an abrupt movement of the battery following a shock causing the cover or back cover to be released from its position in the battery housing.

The invention therefore concerns a device for mounting an energy source of the aforementioned type, characterised in that the cover has holding means intended to be arranged between the retaining means and the periphery of the housing and allowing the energy source retaining means to be held in their first position.

Owing to these holding means, the battery retaining means cannot be deformed in the event of a shock, in the manner described hereinbefore in relation to the aforecited prior art. Moreover, since the holding means arranged on the cover do not exert their action in the direction of the height of the battery housing, but transversely, an abrupt movement of the battery tending to push the cover out of the housing will result in the application of a transverse force on its holding means. Thus, any risk of the cover becoming removed is eliminated.

The means for retaining the battery in the housing advantageously include a plurality of elastic tongues arranged at the periphery of the housing. Each of these tongues preferably includes a short portion bent close to its end, the bent portion thus forming a support zone capable of contacting the face of the battery oriented towards the aperture of the housing.

Moreover, the cover holding means are preferably made in the form of a wall, an annular wall if the battery is of the button type, engaging against the outer surface of the elastic tongues when the cover is positioned in the housing. The dimensions of the wall are adjusted such that the latter exerts a transverse force on the tongues, tending to push them slightly back towards the battery when the housing is closed.

In a preferred embodiment, corresponding to the particular case in which the means for closing the housing are formed by a clip on cover, i.e. fixed to the housing by snap-fitting, the holding wall of the cover also includes snap-fitting means capable of cooperating with a suitable raised portion made on the periphery of the housing.

An alternative embodiment is also provided, wherein the battery retaining tongues fulfil an additional function, namely establishing an electric contact with a terminal of the battery. In such case, the tongues are made of an electrically conductive material having elastic properties.

BRIEF DESCRIPTION OF THE DRAWINGS

Other features and advantages of the present invention will appear more clearly upon reading the following detailed description, made with reference to the annexed drawings, given by way of non-limiting example and in which.

Generally, all of the Figures show only the elements necessary for comprehension of the present invention for the sake of clarifying the following explanation.

DETAILED DESCRIPTION OF THE PREFERRED EMBODIMENTS

Figure 1:
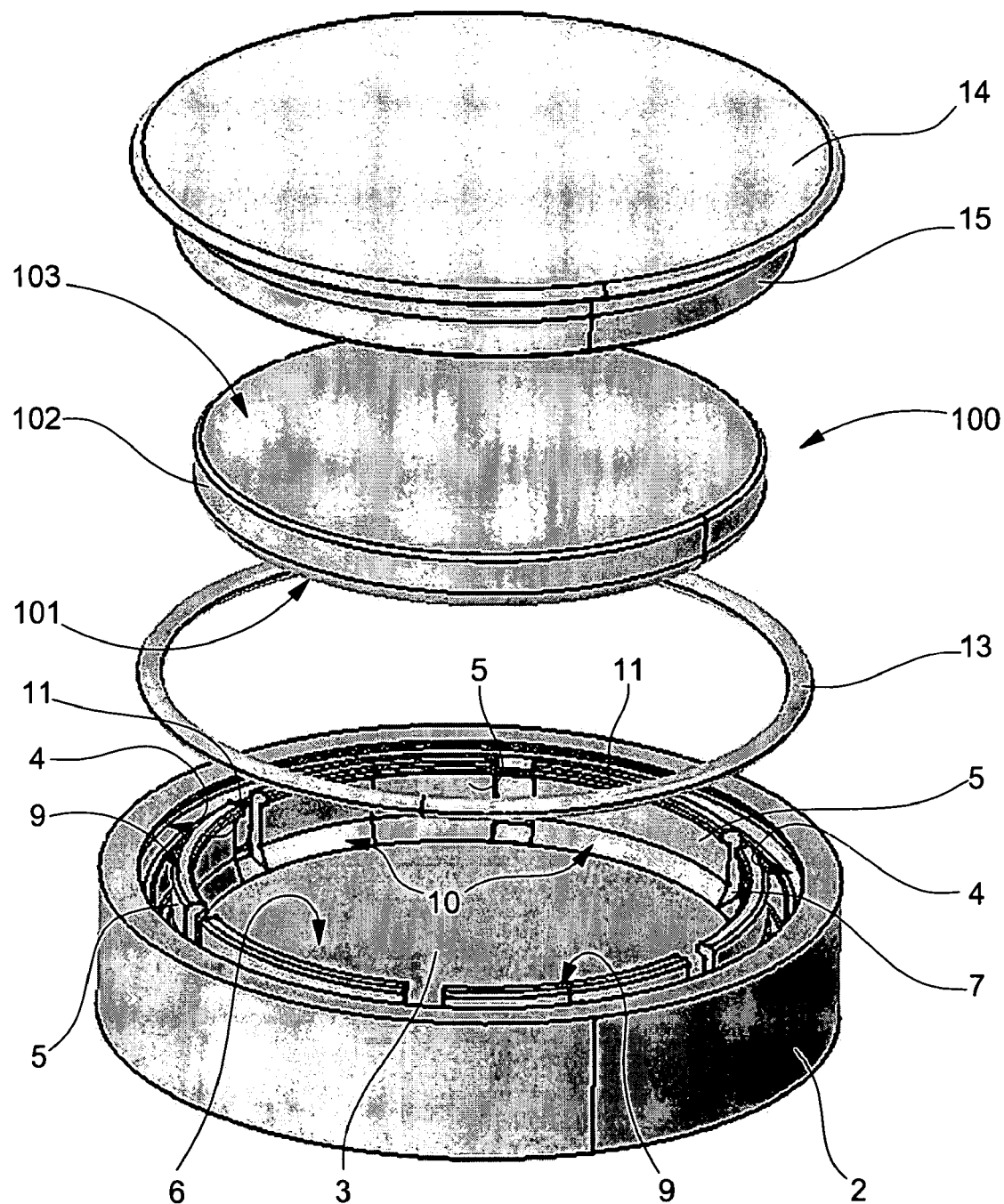
FIG. 1 shows an exploded perspective view of the battery mounting device according to a first preferred embodiment of the present invention.

FIG. 1 shows a battery mounting device 100 for a portable electronic apparatus according to a first embodiment, the device being shown in an exploded view to facilitate comprehension.

The device includes a base 2 which is shown here as a completely separate part but which could be a portion of a case for a portable electronic apparatus. Base 2 includes a housing 3, which is shown here with a cylindrical shape, by way of non-limiting illustration, having a circular aperture 4.

Tongues 5 are arranged regularly spaced on the periphery of housing 3. Each of tongues 5 is linked to the bottom 6 of the housing by a proximal part 7 and then extends vertically from proximal part 7 towards aperture 4, in a portion 8 with a substantially straight section, of smaller thickness than proximal part 7. Each of the tongues ends in a bent portion 9, in its proximal part located beside aperture 4.

It should be noted that each tongue 5 has a generally curved shape of constant curvature, lengthways, such that all of tongues 5 are substantially in the extension of each other to follow the periphery of housing 3 and define the general shape of a circle seen from above.

It will also be noted that, on the one hand, the inner surface of each tongue 5 has a chamfer 10 in the region of its proximal part 7, whereas, on the other hand, bent portion 9 has an end 11 of substantially rounded section.

The periphery of housing 3 has an annular recess forming a shoulder 12 able to receive an O-ring joint 13.

The mounting device further includes closing means represented here, in a non-limiting manner, by a cover 14. Alternatively, the closing means could be made in the form of a back cover, for closing not only housing 3 but also the case of the portable electronic apparatus, as already known from the prior art.

It will be noted in FIG. 1 that cover 14 has a wall 15 that projects from its face intended to be oriented towards the inside of housing 3 and that it is annular in shape. The function of annular wall 15 will be better explained with reference to FIG. 2.

Figure 2:
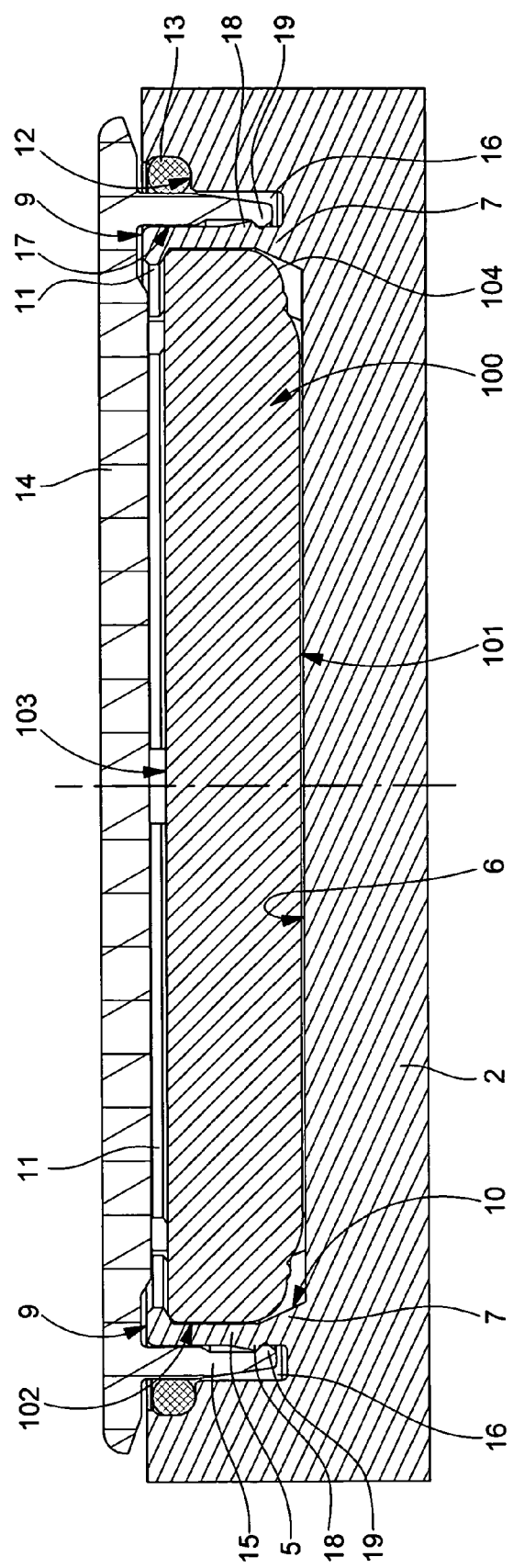
FIG. 2 shows a vertical cross-section of the mounting device shown in FIG. 1, the device being assembled.

FIG. 2 shows a cross-section of the mounting device shown in FIG. 1 along a diameter of the housing cutting through tongues 5, battery 100 being arranged inside its housing 3 and the cover being in place in aperture 4 of the housing.

The respective dimensions of battery 100 and housing 3 are such that the latter is able to receive battery 100, the inner face 101 of battery 100 abutting against bottom 6 of housing 3 and the edge 102 of battery 100 abutting against the inner surface of tongues 5 (visible in FIG. 2).

Alternatively, battery positioning or support studs (not shown) could be provided, moulded with bottom 6 of housing 3 and, possibly made of a compressible material exerting significant friction on the battery, so as to prevent the latter from turning on itself.

It will also be noted that, when battery 100 is in its housing 3, bent portions 9 of tongues 5 are abutting against face 103 of the battery oriented towards cover 14. Thus, the battery is held firmly in place against bottom 6 of housing 3.

Housing 3 includes, at its periphery, an annular groove 16, delimited, on the one hand, by the peripheral part of the housing and, on the other hand, by tongues 5. Flexible tongues 5 can thus be deformed towards groove 16 when battery 100 is positioned in housing 3. Indeed, tongues 5, as shown in FIGS. 1 and 2, are preferably obtained by moulding plastic material simultaneously with the moulding of base 2 and housing 3, the plastic material used having elastic properties. Consequently, and given the respective dimensions of housing 3, tongues 5 and battery 100, the battery is introduced into housing 3 by positioning face 101 of the battery on bent portion 9 of the tongues, followed by pressure exerted on face 103 of the battery in the direction of bottom 6 of the housing.

The junction zone between face 101 and edge 102 of the battery has a rounded portion 104 which cooperates with rounded end 11 of tongues 5 at the moment that pressure is applied by the battery towards the bottom 6 of the housing. During this operation, bent portions 9 of the tongues are simultaneously pushed back towards the periphery of housing 3, which causes an elastic deformation of tongues 5 in groove 16, thus allowing the battery to be inserted into housing 3.

Once battery 100 is engaged at the bottom of housing 3, tongues 5 return to their initial respective positions owing to their elasticity, as shown in FIG. 2, to ensure that battery 100 is held in housing 3.

Since O-ring joint 13 has previously been positioned on shoulder 12 at the periphery of housing 3, cover 14 is placed in aperture 4 of the housing.

Annular wall 15 of cover 14 is then engaged in groove 16. The dimensions of the wall are such that its inner surface is positioned abutting against the outer surface of tongues 5 so as to exert a force thereon tending to push them backwards towards the inside of housing 3. Further, it will be noted that the outer surface of the wall is applied against O-ring joint 13, which contributes to the water-resistance of the housing. The assembly thereby mounted also exhibits a high level of rigidity. It will be noted, in FIG. 2, that the abutting zones of wall 15 respectively against tongues 5 and O-ring joint 13 are located at substantially the same distance from cover 14, this distance also being small.

A system for fixing cover 14 in housing 3 is also provided. Each of tongues 5 is provided with a raised portion 18 on its outer surface, on its proximal part 7, and extending from one edge of the tongue to the other. On its inner surface, wall 15 has a recess forming a notch 19, located in proximity to the end of the wall and extending over its entire periphery. Thus, when cover 14 is arranged in housing 3, all of raised portions 18 and notch 19 are located facing each other and cooperate so as to secure cover 14 in housing 3 by snap-fitting.

Consequently, in the event of a violent shock tending to release battery 100 from its housing 3, the tongues are able to undergo a radial force directed towards the periphery of the housing but they cannot be deformed, because of the blockage achieved by wall 15 of cover 14. Moreover, this blockage is itself indirectly reinforced by the wall pressing against the periphery of the housing, via O-ring joint 13, which allows the excess mechanical energy transmitted by the abrupt movement of battery 100 to be absorbed. It should also be noted that in such a situation of shock, cover 14 does not undergo any stress tending to drive it out of housing 3, guaranteeing a high level of reliability for the battery mounting device that has just been described, particularly from the point of view of water-resistance.

As regards the means for securing cover 14 in housing 3, one could provide, alternatively, that raised portion 18 is arranged on the periphery of housing 3 whereas notch 19 of the cover is arranged on the outer surface of wall 15.

It should be noted that the electrical connection means of the battery poles have not been described, or shown, since they are achieved in a conventional manner and do not make any particular contribution to the present invention. Those skilled in the art will not encounter any particular difficulty in implementing said means. By way of example, one could provide a first conductive contact strip, one end of which is arranged between a tongue 5 and edge 102 of battery 100, the second end of the strip being connected to a first electrical conductive path connected to the electronic circuits of the portable apparatus. A second conductive contact strip is also provided, a first end of which is arranged between inner face 101 of battery 100 and the bottom 6 of the housing, the second end of the strip being connected to a second electrical conductive path, also connected to the electronic circuits of the portable apparatus.

Moreover, one could provide an alternative embodiment implementing a back cover (not shown) to close the case of the portable electronic apparatus, rather than a cover for closing only the battery housing. In such case, the back cover can be provided with a similar wall to that described hereinbefore and arranged so as to project into the battery housing. However, implementation of the structure set out hereinbefore only exhibits all of its advantages when the back cover can easily be removed from the housing, in other words when the back cover is not screwed on or held by screws, for example. In the case of a screwed on back cover that is not liable to be driven out of the housing, the structure according to the aforecited embodiment improves the reliability with which the battery is held in its housing and thus the reliability of the electric power supply to the electronic circuits of the portable apparatus in the event of a shock.

Figure 3:
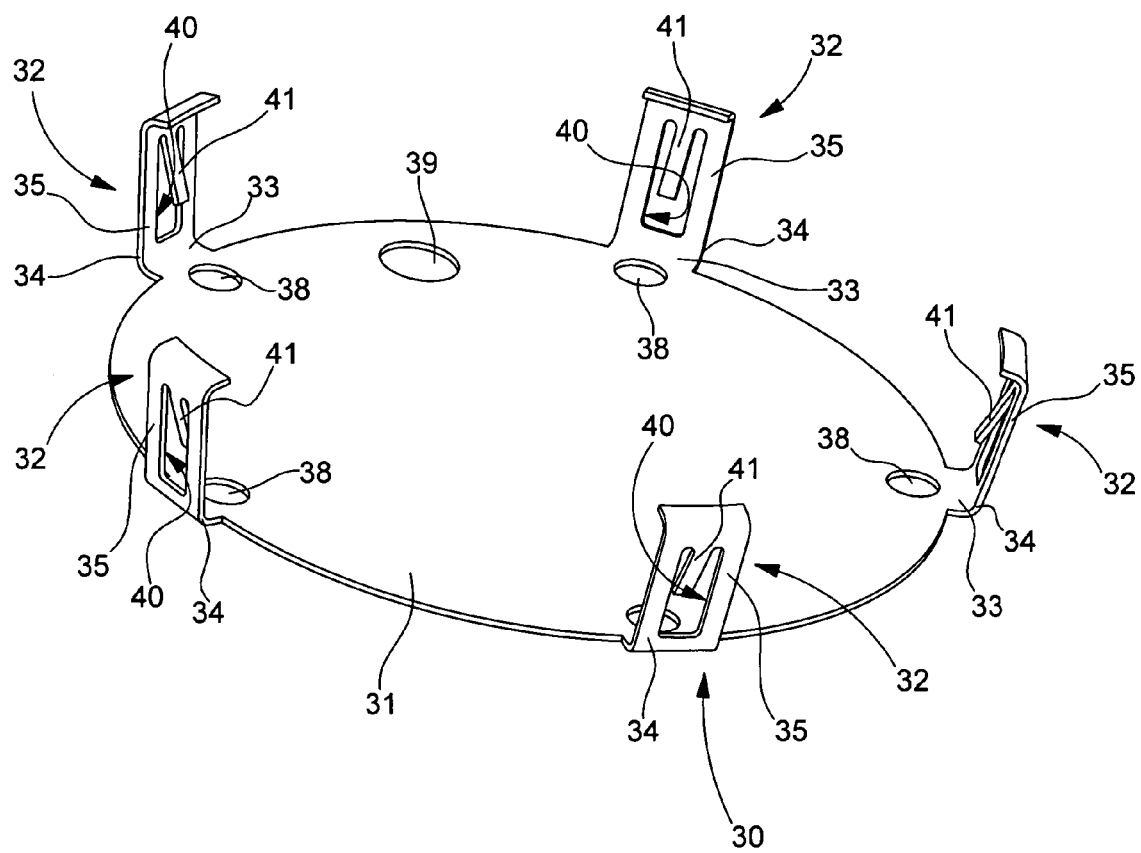
FIG. 3 shows a perspective view of the battery retaining means according to a second preferred embodiment of the present invention.

FIGS. 3 and 4 illustrate a second embodiment of a device for mounting a battery in a portable electronic apparatus, wherein the means for retaining the battery are similar to those described in relation to the first embodiment and further ensure the electrical connection of the electronic circuits of the portable apparatus to one of the poles of battery 100. Since battery 100 is of the same type as that described in relation to FIGS. 1 and 2, the reference numerals related thereto have been preserved.

The main elements of the means used to retain battery 100 according to the present embodiment have been shown alone in FIG. 3 for improved clarity.

This main element is formed of a plate 30 made of an electrically conductive material having elastic properties, preferably a metal such as copper or a metal alloy such as brass. Plate 30 includes a main part 31 that is flat and generally disc-shaped, bearing five identical tongues 32 regularly distributed over the periphery of the plate.

Tongues 32 each have a first portion 33 extending in the extension of main part 31 and ending in a curved portion 34 forming the junction with a second straight portion 35. Each of straight portions 35 is arranged so as to have an angle substantially greater than 90 degrees with respect to main part 31, by way of illustrative example. One could provide, more generally, that the angle formed between each straight portion 35 and main part 31 is comprised between 80 and 100 degrees. Each straight portion 35 ends in another curved portion 36, directed towards the centre of main part 31 and establishing the junction with a third short portion 37 of tongue 32. The third portions 37 of the set of tongues 32 are located in substantially the same plane parallel to the plane of main part 31 of plate 30.

It will be observed in FIG. 3 that main part 31 of plate 30 includes a hole 38 facing first portion 33 of each of tongues 32. An additional hole 39 is also visible in main part 31 of the plate.

The respective functions of holes 38 and 39 will be explained hereinafter in relation to the description of FIGS. 4a and 4b.

Moreover, each of straight portions 35 includes a recess 40 at its centre inside which extends a lug 41 that is substantially straight and slightly bent inside plate 30. Likewise, the function of these lugs 41 will be explained hereinafter in relation to FIGS. 4a and 4b.

Figure 4A:
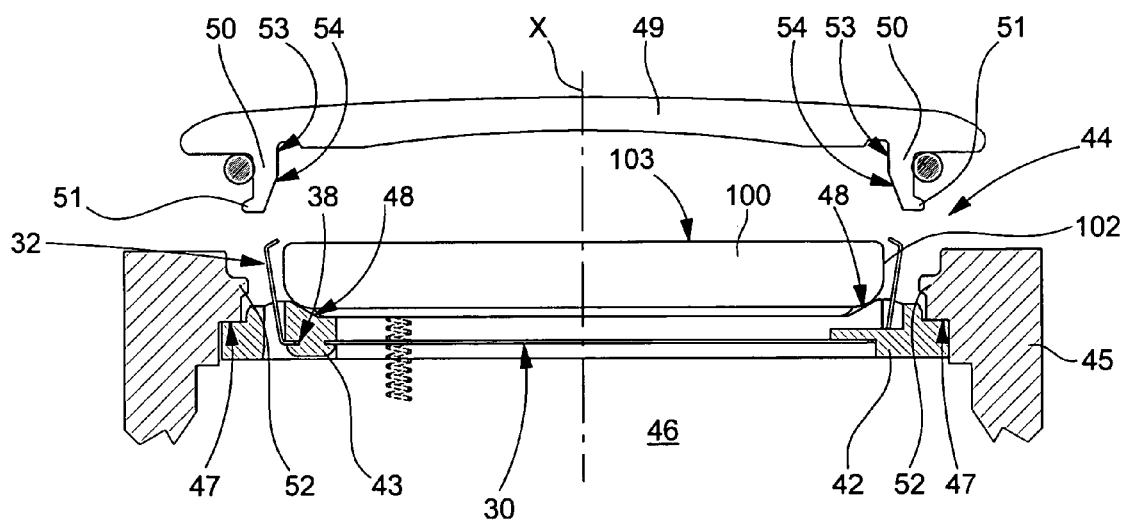
FIG. 4a shows a cross-section of the battery mounting device corresponding to the second embodiment of FIG. 3, the cover not being engaged in the battery housing.
Figure 4B:
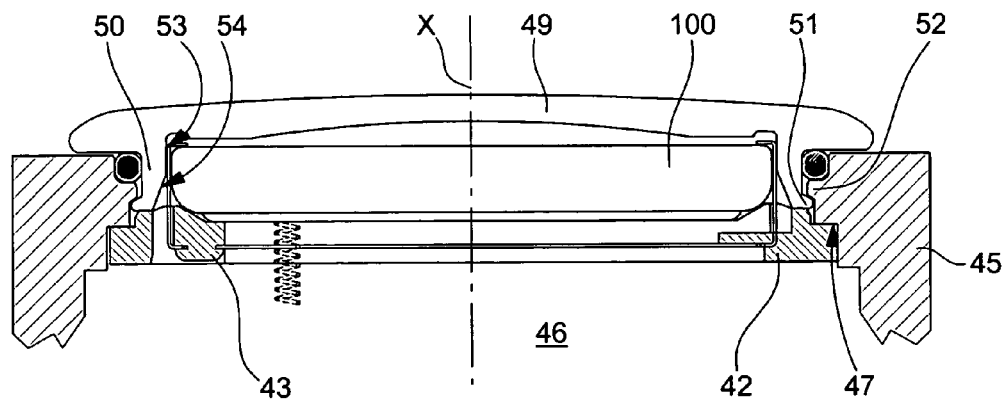
FIG. 4b shows a similar view to the view of FIG. 4a, the cover being in place in the battery housing

FIGS. 4a and 4b allow the working of the battery mounting device according to the present embodiment to be better understood, plate 30 described in relation to FIG. 3 being shown mounted in the mounting device.

Plate 30 is mounted secured to an intermediate part forming a spacer 42 preferably made by moulding plastic material. Plate 30 can be secured to spacer 42 by any means known to those skilled in the art. In the example shown here, spacer 42 includes a plurality of studs 43 (only one being visible in FIG. 4) whose section has a diameter slightly smaller than the diameter of holes 38 of plate 30. Thus, when the present device is mounted, studs 43 of spacer 42 are mounted into holes 39 then thermowelded to have a rivet type final structure, as can be seen in the Figures.

The assembly formed by spacer 42 bearing plate 30 is arranged inside a battery housing 44 arranged in a base 45 of a portable electronic device. For this purpose, the present illustration shows a cylindrical opening 46, provided in base 45, to allow the spacer and plate to be inserted from inside the portable electronic apparatus. Opening 46 ends in an annular shoulder 47 forming the inner limit of housing 44 and on which spacer 42 abuts to be held in a fixed axial position with respect to housing 44.

FIG. 4a shows that tongues 32 of plate 30 are substantially separated in their rest position, i.e. they have an angle slightly greater than 90 degrees with respect to main part 31. It will be noted that in this configuration, in the particular case shown here, the opening defined by the ends of the bent portions of tongues 32 has a larger diameter than that of battery 100. This feature advantageously allows battery 100 to be inserted in housing 44 simply by depositing it on the top of spacer 42, by a movement exclusively including a rectilinear translation in the same direction as that of the axis X of symmetry of the housing. Of course, one could provide a smaller diameter of the opening defined by the tongues such that the latter are elastically deformed when the battery is inserted, as described for the first embodiment. In such case, insertion of the battery onto the bottom of the housing has to include an additional step, with respect to the preceding description, consisting in pressing the battery to deform the tongues after simply having deposited the battery on top of them.

Spacer 42 further includes a support surface 48 for battery 100 for substantially defining the axial position of the latter with respect to housing 44.

Once battery 100 is in place in housing 44, the latter can be closed by a cover 49 having a similar shape to that of cover 14 described in relation to the first embodiment. Cover 49 has an annular wall 50 which is arranged to fulfil a dual function of securing cover 49 in housing 44 and holding tongues 32 against battery 100.

For this purpose, the free end of wall 50 has a short bent portion forming a notch 51 in the direction of the periphery of housing 44 and intended to cooperate with a raised portion 52 arranged on the periphery of housing 44.

Moreover, the inner surface of wall 50 has two portions, from cover 49 towards the bent end forming notch 51, a first portion 53 being substantially parallel to axis X of housing 44, whereas the second portion 54 is slightly inclined with respect to axis X towards the periphery of the housing. It is clear from FIG. 4a that the inclination of second portion 54 of wall 50 is preferably adjusted so that the inner diameter of the wall at notch 51 is substantially greater than the diameter of the opening defined by tongues 32. Thus, when cover 49 is placed above housing 44, second portion 54 of edge 50 comes into contact with bent portion 36 of each of tongues 32 to fulfil a guide surface function. Further, because of the inclination of second portion 54, the more cover 49 is lowered into housing 44, the more tongues 32 undergo an elastic deformation in the direction of axis X of the housing.

When cover 49 is placed in housing 44, wall 50 also having undergone an elastic deformation in order to allow notch 51 to pass under raised portion 52, tongues 32 are applied against edge 102 of battery 100, via their respective inner surfaces and lugs 41. This configuration is visible in FIG. 4b. The tongues are then held in this closed position because of the support formed by first portion 53 of wall 50.

It will be observed then that the third short portions 37 of each tongue 32 are arranged abutting face 103 of the battery, oriented towards cover 49, thereby ensuring the axial retaining of battery 100 in housing 44.

As plate 30 is preferably obtained by stamping a sheet of metal material, it clearly appears in FIG. 4b that tongues 32 allow an electrical connection to be established with a pole of battery 100 (typically the positive pole, accessible on face 103 and edge 102), in addition to ensuring that the latter is held mechanically in housing 44.

Moreover, the particular shape of lugs 41, described hereinbefore in relation to FIG. 3, guarantees proper contact between tongues 32 and edge 102 of battery 100, because they are pre-formed towards the inside of housing 44.

Additional means (not shown) are also provided to establish an electrical connection between plate 30 and the electronic circuits of the portable electronic apparatus.

Electrical connection means to the second pole of battery 100, accessible through face 101 of the battery, oriented towards the bottom of housing 44, have been shown by way of non-limiting example. These connection means include, for example, a helical-type spring 55 made of electrically conductive material and, connected via a first end (not shown) to the electronic circuits of the portable electronic apparatus. The second end of spring 55 is placed in contact with face 101 of battery 100, the spring extending through hole 39 of plate 30 (shown in FIG. 3) and through a similar hole (not shown) arranged in spacer 42, facing hole 39.

It should be noted that the retention quality of battery 100 in housing 44 assured by the structure of the present embodiment is comparable to that of the first embodiment. Thus, in the event of a violent shock, battery 100 and cover 49 are held in housing 44 with the same efficiency as in the case of the structure previously described in relation to FIGS. 1 and 2.

Moreover, it should also be noted that an O-ring joint 56 is arranged around wall 50 to ensure the water-resistance of housing 44 when cover 49 is set in place, by compression between cover 49 and raised portion 52.

In the same way as for the embodiment described hereinbefore, the battery mounting device that has just been described could be implemented in the case wherein the case of the portable electronic apparatus is closed by a back cover, which also closes the battery housing. In this case, a wall of the same type as wall 50 has to be arranged on the face of the back cover that will be placed opposite the battery housing.

Figure 5:
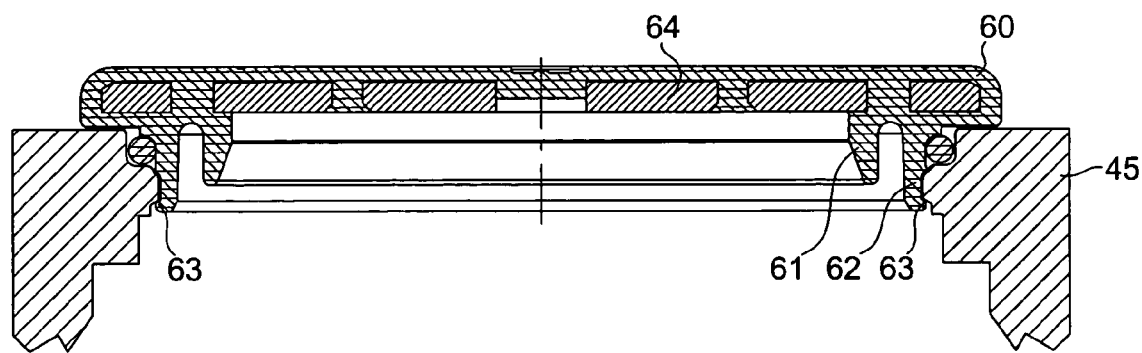
FIG. 5 shows a similar view to the view of FIG. 4a and according to an alternative embodiment of the present invention.

FIG. 5 shows a cover 60 according to a variant of the present invention applied to a cover of the type described in connection with the second embodiment. Of course, the present variant can also be implemented with a cover of the type described in connection with the first embodiment.

Cover 60 comprises two concentric annular walls 61 and 62 each fulfilling one of the two functions fulfilled by cover 50 as described in connection with FIGS. 4a and 4b. Internal wall 61 assures the function of guide surface for lugs (not shown) similar to lugs 32 of FIGS. 4a and 4b and provided for retaining the battery in its housing. External wall 62 comprises a notch 63 at its free end oriented towards the periphery of the battery housing (not referenced), so as to cooperate with a bulge arranged on the periphery of the housing in a similar manner to what was described above.

Moreover, one can see in FIG. 5 that cover 60 further comprises a reinforcement plate 64 for improving the rigidity of the cover. Preferably, reinforcement plate 64 can be a metal plate and embedded in the plastic material forming the cover, via a conventional overmoulding process.

Only base 45 of battery housing (see FIG. 4a) in FIG. 5 has been shown for the sake of clarity. One important feature of the cover according to the present variant of the invention can be seen in this Figure, this feature residing in the fact that reinforcement plate 64 has larger transverse dimensions than that of the opening of the battery housing. Thus, the reinforcement plate is indirectly arranged in abutment against base 45 when the cover is set in place in the battery housing.

Owing to this particular feature, cover 60 can support high pressure from the exterior surroundings without undergoing visible deformations and consequently without affecting the water resistance of the battery housing.

Thus, cover 60 can typically be used to assure the closing of a battery housing for a watch of the diving watch type and guaranteeing water resistance of the battery housing for depths of several hundreds of meters.

It is clear from the description hereinbefore, of two embodiment examples according to the present invention, that the structure of this apparatus for mounting a battery in an electronic apparatus provides that automated battery mounting can easily be envisaged during assembly of the electronic apparatus. Indeed, in the case of the first embodiment, the battery need only be deposited on top of the tongues before exerting slight pressure on the battery in the direction of the housing to set it in place, prior to closing the housing with the cover. In the case of the second embodiment, it is even simpler to set the battery in place, in that the aforecited pressure is not even necessary to make the battery descend into the housing. The operation of depositing the battery in the housing can be achieved by a simple rectilinear translation from the external environment towards the inside of the housing. This particular feature has a certain economic advantage, in particular within the scope of the large scale manufacture of electronic apparatus.

The preceding description corresponds to preferred embodiments and should in no way be considered as limiting, as regards more particularly the shape described for the various structural elements forming the mounting device or their materials. Those skilled in the art will not encounter any particular difficulty in choosing, for example for the battery retaining means, any other material having the mechanical properties necessary for implementing the present invention. Likewise, the number of tongues described in one embodiment or another is not limiting. Those skilled in the art will be able to implement a different number of tongues while taking care to maintain a good compromise between the length of a tongue and its elasticity, more particularly for the first embodiment, and between the number of tongues and proper retention of the battery, more particularly for the second embodiment.

The applications possible for such a battery mounting device are very numerous since the present invention can be implemented for any type of portable electronic apparatus, particularly worn on the hand or wrist, such as an electronic wristwatch for example.

The invention claimed is:

1. A device for mounting a source of electrical energy in a portable electronic apparatus, said device including a housing, capable of receiving said energy source, and a cover for closing said housing,
   the housing having, in proximity to its periphery, means for retaining the energy source and having at least a closed position in which said energy source is held in said housing, and
   the housing including an aperture towards the exterior located opposite a bottom, wherein said retaining means comprises tongues that can be deformed, extending from said bottom of said housing towards said aperture, the end of each of said tongues including a bent portion forming a support zone capable of being arranged on one face of said energy source oriented on the side of said aperture, and
   wherein said cover has holding means projecting into said housing intended to be arranged between the tongues and the periphery of the housing in order to allow the tongues to be held in said closed position.

2. A mounting device according to claim 1, wherein said tongues are elastic and wherein said holding means include an annular wall arranged towards the periphery of said cover and having a support zone capable of being applied against said tongues to deform them in the direction of the inside of said housing.

3. A mounting device according to claim 1, wherein said energy source retaining tongues are made in one piece with said energy source housing, the housing being obtained by moulding plastic material.

4. A mounting device according to claim 1, wherein the respective ends of the tongues are rounded to facilitate insertion of the energy source in said housing.

5. A mounting device according to claim 1, wherein it includes means for ensuring sealing between said cover and said housing.

6. A mounting device according to claim 1, the housing comprising an opening towards the exterior, wherein said cover includes a reinforcement plate having transverse dimensions greater than that of said opening.

7. A mounting device according to claim 2, said energy source housing being substantially cylindrical, wherein the aperture defined by the ends of said tongues has smaller dimensions than the dimensions of the energy source.

8. A mounting device according to claim 2, wherein said energy source housing includes a raised portion arranged in its periphery, said cover including means capable of cooperating with said raised portion to allow it to be snap-fitted in said housing.

9. A mounting device according to claim 2, wherein each of said tongues includes a raised portion arranged in proximity to the proximal portion of its outer surface, said cover including means capable of cooperating with the set of said raised portions to allow it to be snap-fitted in said housing.

10. A mounting device according to claim 2, when the energy source is of the button-battery type, wherein said tongues are made of an electrically conductive material and further perform an electrical contact function with the edge of said battery and/or the face of said battery oriented towards said aperture, said tongues being connected to connection means towards the electronic circuits of said electronic apparatus.

11. A mounting device according to claim 6, wherein said reinforcement plate is made of metal and is overmoulded at least partially inside said cover.

12. A mounting device according to claim 8, wherein said means include a notch made on the outer surface of said annular wall and capable of cooperating with said raised portion.

13. A mounting device according to claim 9, wherein said means include a notch made in the lower part of the inner surface of said annular wall and capable of cooperating simultaneously with the set of said raised portions.

14. A mounting device according to claim 10, wherein it includes a substantially flat plate made of electrically conductive material acting as a support for said tongues and arranged in the bottom of said battery housing, an intermediate element made of an electrically insulating material, secured to said housing, being also provided to form at least partially a support surface for the face of the battery oriented towards the bottom of said housing and to insulate the latter from said plate.

15. A mounting device according to claim 10, wherein the aperture defined by the ends of said tongues at rest has larger dimensions than the transverse dimensions of the battery.

16. A mounting device according to claim 10, wherein said battery housing includes a raised portion arranged in its periphery and wherein said annular wall of the cover further includes a notch made on its external surface capable of cooperating with said raised portion to enable said cover to be snap-fitted in said housing.

17. A mounting device according to claim 14, wherein said intermediate element includes a location in which said plate is fixed, said intermediate element further including elements that project with respect to the plane of said plate and oriented towards the aperture of the battery housing forming said support zone for the battery.

18. An electronic apparatus including electronic circuits powered by an electric energy source such as a battery, wherein said apparatus includes a device for mounting said electric energy source and comprising a housing, capable of receiving said energy source, and a cover for closing said housing, the housing having, in proximity to its periphery, means for retaining the energy source and having at least a closed position in which said energy source is held in said housing, and the housing including an aperture towards the exterior located opposite a bottom, wherein said retaining means comprises tongues that can be deformed, extending from said bottom of said housing towards said aperture, the end of each of said tongues including a bent portion forming a support zone capable of being arranged on one face of said energy source oriented on the side of said aperture, and wherein said cover has holding means projecting into said housing and intended to be arranged between said tongues and the periphery of the housing in order to allow said tongues to be held in said closed position.

19. A method for mounting a source of electric energy such as a battery in a mounting device in accordance with claim 2, wherein said method comprises the steps of:

a) placing an energy source whose electric poles are suitably oriented opposite said mounting device;

b) depositing, via a movement exclusively comprising a substantially rectilinear translation in the direction of the housing, the energy source in the energy source housing of said mounting device; and c) placing a cover in the aperture of said energy source housing.

20. A method for mounting a source of electric energy such as a battery in a mounting device according to claim 7, wherein said method comprises the steps of:

a) placing an energy source whose electric poles are suitably oriented opposite said mounting device;

b) depositing, via a movement exclusively comprising a substantially rectilinear translation in the direction of the housing, the energy source on the ends of the tongues arranged in the battery housing of said mounting device;

c) exerting pressure on said energy source to force said energy source to descend into the housing; and placing a cover in the aperture of said energy source housing.

* * * * *